(12) United States Patent
Ishizuka

(10) Patent No.: US 7,284,800 B2
(45) Date of Patent: Oct. 23, 2007

(54) SEAT BACK FRAME FOR AUTOMOTIVE SEAT

(75) Inventor: Takanori Ishizuka, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 105 days.

(21) Appl. No.: 11/320,836

(22) Filed: Dec. 30, 2005

(65) Prior Publication Data

US 2007/0152489 A1    Jul. 5, 2007

(51) Int. Cl.
- *A47C 1/02* (2006.01)
- *B60N 2/42* (2006.01)
- *B60N 2/44* (2006.01)
- *B60N 2/46* (2006.01)
- *B60N 2/68* (2006.01)

(52) U.S. Cl. .......................... 297/452.18; 297/216.13; 297/411.32; 297/463.1; 297/463.2

(58) Field of Classification Search ........... 297/452.18, 297/216.13, 411.32, 463.1, 463.2
See application file for complete search history.

(56) References Cited

U.S. PATENT DOCUMENTS

| | | | | |
|---|---|---|---|---|
| 4,205,879 A | * | 6/1980 | Heling | 297/411.32 |
| 4,695,097 A | * | 9/1987 | Muraishi | 297/452.18 |
| 5,131,721 A | * | 7/1992 | Okamoto | 297/452.18 |
| 5,509,716 A | * | 4/1996 | Kolena et al. | 297/216.13 |
| 6,371,561 B1 | * | 4/2002 | Iwamoto et al. | 297/452.18 |
| 6,375,267 B1 | * | 4/2002 | Ishikawa | 297/452.18 |
| 6,767,068 B1 | | 7/2004 | Fujii et al. | |
| 6,769,737 B2 | * | 8/2004 | Choi | 297/216.13 X |
| 6,857,698 B2 | * | 2/2005 | Saberan et al. | 297/216.13 |
| 7,066,552 B2 | * | 6/2006 | Yoshida | 297/452.18 |

FOREIGN PATENT DOCUMENTS

| | | | | |
|---|---|---|---|---|
| JP | 06070827 A | * | 3/1994 | 297/452.18 |
| JP | 2000-350637 | | 12/2000 | |

* cited by examiner

*Primary Examiner*—Rodney B. White
(74) *Attorney, Agent, or Firm*—Browdy and Neimark, PLLC

(57) ABSTRACT

A seat back frame of automotive seat, which has an armrest connection point in one of the two side frame members thereof, to which an armrest may be mounted. A reinforcing element is removably secured between such one of the two side frame members and a lower frame member of the seat back frame. The reinforcing element is so formed to have a long portion and a short vertical portion extending vertically and continuously from the long portion. Such long portion and short vertical portion are removably secured to the foregoing lower frame member and the foregoing one of the two side frame members, respectively.

5 Claims, 2 Drawing Sheets

SEAT BACK FRAME FOR AUTOMOTIVE SEAT

BACKGROUND OF THE INVENTION

1. Field of the Invention

The present invention relates to a seat back frame for use in an automotive seat, which allows an armrest to be mounted to one lateral side thereof. Particularly, the invention is directed to the seat back frame of the type wherein a large size of armrest can be mounted to one lateral side thereof.

2. Description of Prior Art

Recently, some of automotive seats are equipped with a large size of armrest at one lateral side of a seat back thereof. In most cases, such large size of armrest is rotatably mounted to the lateral side of seat back to allow for providing a wide support area on which an arm of a seat occupant can be comfortably rested.

However, since the large size of armrest is naturally increased in weight, an unexpected excessive load is applied therefrom intensively to one side of the seat back, with it being therefore of a high likelihood that a seat back frame in the seat back will be twisted and damaged due to such excessive load.

To solve such problem, generally stated, it is necessary to reinforce the seat back frame itself to a satisfied degree by increasing a thickness of each constituent part thereof, such as a side frame member to which the large-sized armrest is directly mounted and other peripheral frame members connected with the side frame member.

As a consequence thereof, such intricately reinforced seat back frame is found defective in not only increasing costs and number of required parts, but also encountering the difficulty to reform it directly into an ordinary seat back frame without any armrest mounted thereto. Thus, conventionally, the seat back frame itself can not be directly used in the case where the large-sized armrest is mounted thereto, as a result of which, it is required to provide two separate forming dies, including two separate press dies, one of which is designed for forming an ordinary seat back frame without requiring armrest, and another of which is designed for forming a seat back frame of robust structure sufficient to allow a large-sized armrest to be mounted thereto, which further undesirably increases costs involved.

SUMMARY OF THE INVENTION

In view of the above-sated drawbacks, it is a purpose of the present invention to provide an improved seat back frame of automotive seat which is of a robust and simplified structure that allows a large-sided armrest to be mounted thereto, and further allows direct use of one ordinary seat back frame, irrespective of whether the armrest is mounted or not mounted thereto.

In order to achieve such purpose, a seat back frame of automotive seat of the present invention is basically comprised of:

- an upper frame member;
- a lower frame member disposed below the upper frame member;
- a pair of side frame members connected between the upper and lower frame members, wherein one of such pair of side frame members has a connection point to which an armrest is to be mounted; and
- a reinforcing element provided longitudinally between the lower frame member and the afore-said one of pair of side frame members, the reinforcing element including:
  - a long portion extending in the longitudinal direction thereof;
  - a short vertical portion extending vertically and continuously from the long portion;
  - at least two spaced-apart securing points defined in the long portion; and
  - at least one securing point defined in the vertical small portion, wherein the long portion is removably and securely connected with and along the lower frame member at the afore-said at least two first spaced-apart securing points, and wherein afore-said short vertical portion is removably and securely connected with afore-said one of pair of side frame member at the afore-said at least one securing point.

Other various features and advantages of the present invention will become apparent from reading of the description hereinafter, with reference to the annexed drawings.

DETAILED DESCRIPTION OF PREFERRED EMBODIMENT OF THE INVENTION

Referring to FIGS. 1 to 4, there is illustrated a preferred mode of seat back frame which allows a large-sized armrest to be mounted thereto, generally designated by (BF), in accordance with the present invention.

Figure 1:
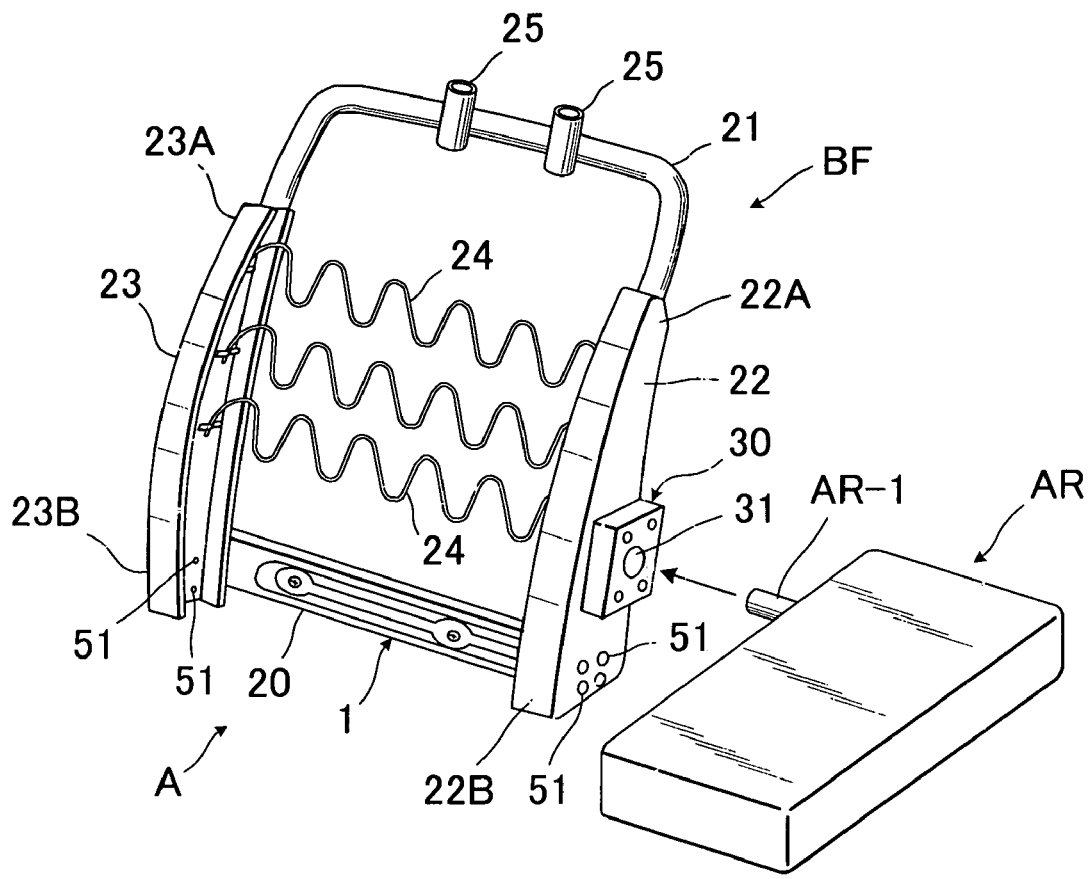
FIG. 1 is a partly exploded schematic perspective view of a seat back frame of automotive seat in accordance with the present invention.

Designation (BF) denotes a known seat back frame to be provided in a seat back of an automotive seat (not shown). As shown in FIG. 1, the seat back frame (BF) is basically composed of an upper frame member (21), a lower frame member (20), and a pair of first and second side frame members (22) (23).

The upper frame member (21) is formed by bending a tubular material to having a generally "inverted U" shape, as known in the art. A pair of headrest stay holders (25) (25) are fixed to the horizontal portion of such generally inverted-U-shaped upper frame member (21), so that two headrest stays of a headrest (not shown) may be inserted and supported in those two holders (25) (25), respectively.

The first side frame member (22) is formed from a rigid plate material in the form of channel cross-section having a main wall region (22A) and a pair of bent flange wall regions (22B) (22B) extending at a right angle from the main wall region (22A). This first side frame member (22) is connected at the upper end portion thereof fixed as by welding to one end portion (on the right side as viewed from FIG. 1) of the foregoing generally inverted-U-shaped upper frame member (21).

Likewise, the second side frame member (23) is formed from a rigid plate material in the form of channel cross-section having a main wall region (23A) and a pair of bent flange wall regions (23B) (23B) extending at a right angle from the main wall region (23A). This second side frame member (23) is connected at the upper end portion thereof as by welding to another end portion (on the left side as viewed from FIG. 1) of the foregoing generally inverted-U-shaped upper frame member (21).

As viewed from FIG. 1, the first and second side frame members (22) (23) are disposed on the right and left sides, respectively. It is therefore observed that the two main wall regions (22A) (23A) respectively of the first and second side frame members (22) (23) face outwardly of the seat back frame (BF), while on the other hand, two flange wall regions (22B) (22B) respectively of the first and second side frame members (22) (23) face to each other in a direction inwardly of the seat back frame (BF).

The aforementioned lower frame member (20) is fixedly connected between the two lower end portions respectively of the first and second side frame members (22) (23).

Designations (24) denote a plurality of sinuous springs extended between the first and second side frame members (22) (23) for the purpose of resiliently supporting a back of a seat occupant.

Designations (51) denote a plurality of securing holes formed in the two lower end regions respectively of the first and second side frame members (22) (23), at which arm members of reclining device (not shown) are to be firmly connected by inserting securing bolts therethrough. This is not the subject matter of the present invention and no further explanation is given thereon.

In this seat back frame (BF), as shown in FIG. 1, a large-sized armrest (AR) may be mounted to the first side frame member (22), as is known in the art. This large-sized armrest (AR) is specially formed in a size larger than an ordinary armrest with a view to providing a wide area on which a user can comfortably rest his or her arm. For that purpose, a connecting support member (30) may be fixedly attached to the main wall region (22A) of the first side frame member (22) by means of securing bolts (32) for instance. As shown, a bearing hole (31) is formed through the connecting support member (30) and main wall region (22A) of the first side frame member (22), so that a shaft (AR-1) of the large-sized armrest (AR) may be inserted in that bearing hole (31). In this respect, while not shown, the shaft (AR-1) may be retained in the bearing hole (31) by a suitable means against removal therethrough so as to allow the armrest (AR) to be rotated about the shaft (AR-1) vertically between a non-use position where the armrest (AR) is stored in an upstanding manner and a use position where the armrest (AR) is set in a generally horizontal state. This is not the subject matter of the present invention and no further description is not made thereof.

Figure 2:
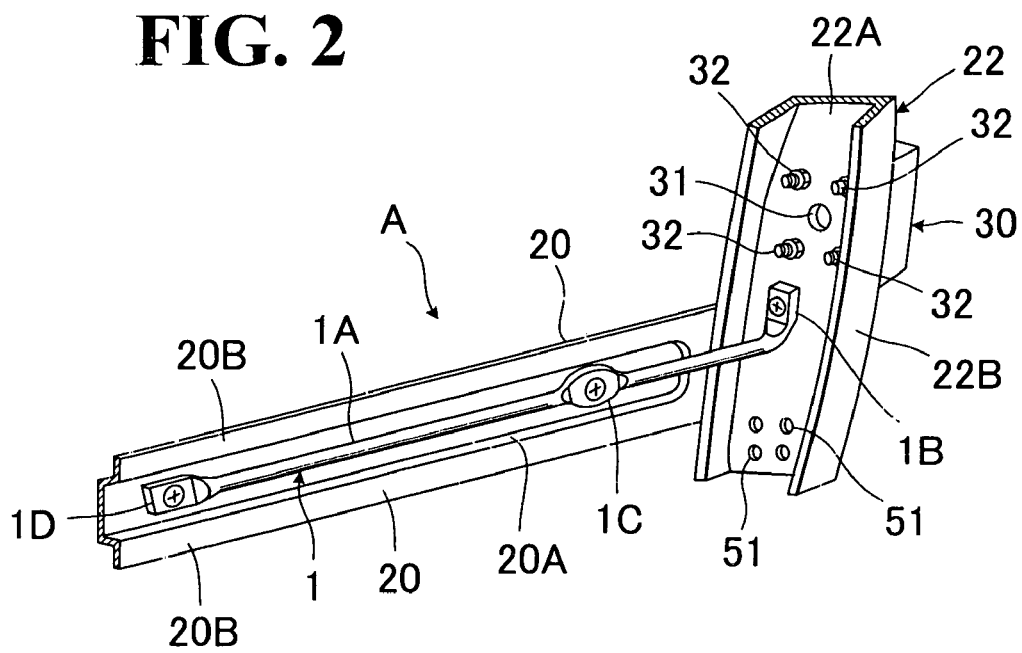
FIG. 2 is a partly broken schematic perspective view showing a principal part of the seat back frame in the present invention.

In accordance with the present invention, with particular reference to FIG. 2, there is provided a reinforcing bar element (1) between the lower frame member (20) and the first side frame member (22). Also, in accordance with the invention, a securing hole (35), one element for securing a vertical end portion (1B) of such reinforcing bar element (1) to the first side frame member (22) as will be elaborated later, is formed in the main wall region (22A) of the first side frame member (22) below a point where the afore-said connecting support member (30) is situated. While not clearly shown, the securing hole (35) is a threaded hole.

Figure 3:
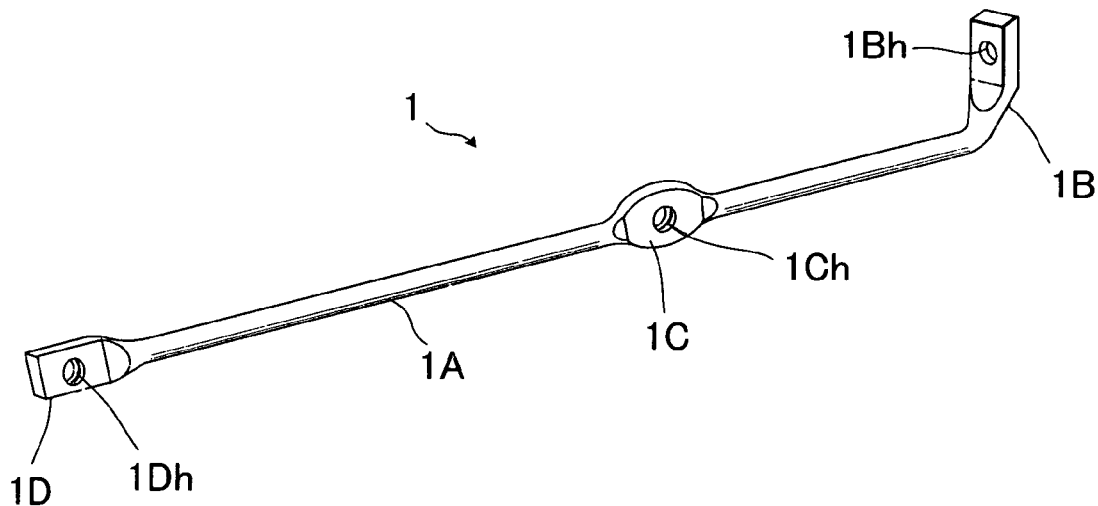
FIG. 3 is a schematic perspective showing a reinforcing bar element which is one of the principal parts of the present invention.

As best shown in FIG. 3, the reinforcing bar element (1) is basically formed from a rigid material, such as a steel, in a generally "L" shape, which has, defined therein, a longitudinally or rectilinearly extending long bar portion (1A) and a vertically extending short bar portion (1B).

According to the illustrative mode of such reinforcing bar element (1), the longitudinal long bar portion (1A) thereof extends horizontally, whereas, the vertical short bar portion (1B) thereof extends upwardly and continuously from the right-side end of that long bar portion (1A) at substantially a right angle.

Formed in the foregoing long bar portion (1A) are a flattened securing end portion (1D) and a flattened securing region (1C).

As shown, both flattened securing end portion (1D) and flattened securing region (1C) are defined in a vertically expanding manner with respect to the longitudinal axis of long bar portion (1A). The flattened securing region (1C) is disposed at a point near to the short vertical bar portion (1B).

Designations (1Dh) denotes a threaded securing hole formed in the flattened securing end portion (1D), and designation (1Ch) denotes a threaded securing hole formed in the flattened securing region (1C).

The foregoing flattened securing end portion (1D) and its associated hole (1Dh) as well as the foregoing flattened securing region (1C) and its associated hole (1Ch) are all adapted for firm connection with a flat wall of the lower frame member (20), as will be described later. On the other hand, the short vertical bar portion (1B) of this reinforcing bar element (1) is shown as including a flattened end portion in which a threaded securing hole (1Bh) is formed. Such flattened end portion is defined so as to expand transversely of and orthogonally with the longitudinal axis of the long bar portion (1A), and therefore, both of those flattened end portion and the securing hole (1Bh) are adapted for firm connection with the inner side of the main wall portion (22A) of the first side frame member (22).

Figure 4:
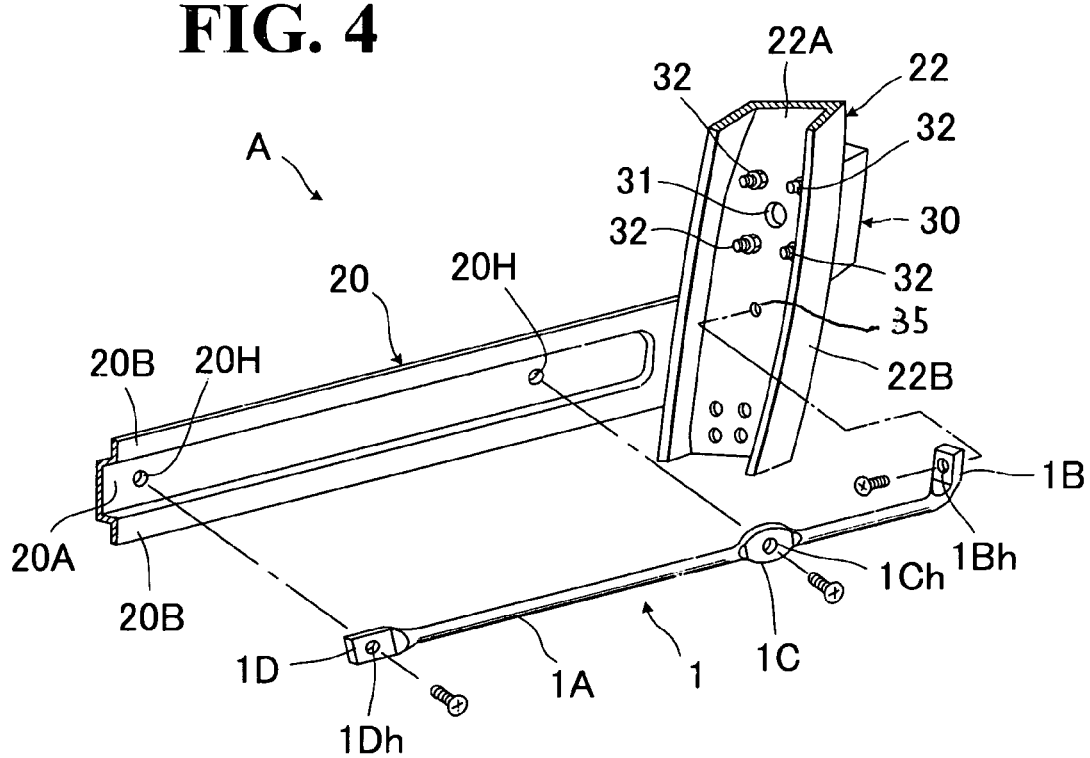
FIG. 4 is a partly broken schematic perspective view for explanatorily showing how the reinforcing bar element is connected with the seat back frame.

In accordance with the present invention, as best shown in FIG. 4, the lower frame member (20) is formed from a rigid plate material, in which is formed a reinforcing bead portion (20A) by suitable press working so as to be recessed from a main plate body portion (20B) and extend in the longitudinal direction of lower frame member (20). In that reinforcing bead portion (20A), a pair of spaced-apart securing holes (20H) (20H) are formed so as to be in alignment with the respective two threaded securing holes (1Dh) (1Ch) formed in the long bar portion (1A) of the reinforcing bar element (1). While not clearly shown, each of those holes (20H) is a threaded hole.

As constructed above, a particular reference is now made to FIG. 4. As can be seen from that FIG. 4, the long bar portion (1A) of the reinforcing bar element (1) is attached in and along the reinforcing bead portion (20A), and then, by driving two securing bolts into the respective two securing threaded holes (20H), the reinforcing bar element (1) is firmly connected to the lower frame member (20) so as to extend along the reinforcing bead portion (20A), thereby retaining the long bar portion (1A) thereof in position. At this point, it is seen that both spaced-apart two flattened securing end portion (1D) and flattened securing region (1C) are closely contacted upon the flat surface (at 20A) of the lower frame member (20), which insures that the long bar portion (1A) of reinforcing bar element (1) is stably retained against rotation about its central axis. This in turn insures to locate the short vertical bar portion (1B) in position with respect to the inner side of the main wall portion (22A) of the first side frame member (22), so that the threaded securing hole (1Bh) of that short vertical bar portion (1B) is in alignment with the threaded securing hole (35) formed in that particular main wall portion (22A). Thereafter, by driving a securing bolt into both of the thus-aligned two securing holes (1Bh) (35), the short vertical bar portion (1B) of reinforcing bar element (1) is firmly connected with the first side frame member (22), with the flattened end portion of that short vertical bar portion (1B) being closely contact with the flat surface of the first side frame member's main wall portion (22A).

Accordingly, as shown in FIG. 2, a whole of the reinforcing bar element (1) is securely and directly connected between the lower frame member (20) and the first side frame member (22) by only using the three securing bolts.

It is therefore appreciated that, in accordance with the present invention, the following advantages and effects are attained:

(i) The provision of such horizontally extending reinforcing bar element (1) between the lower frame member (20) and the first side frame member (22) to which-the large-sized armrest (AR) is mounted is effective for not only providing additional resistance against an excessive load applied from the heavy large-sized armrest (AR), but also transmitting and dispersing that load in and along the lower frame member (20). In this respect, the lower frame member (29) is further reinforced by the press-formed bead portion (20A). Hence, the seat back frame (BF) is assuredly protected against twisting and deformation which is due to an excessive load applied to one side frame member (22) from the large-sized armrest (AR).

(ii) Only one reinforcing bar element (1) may be firmly attached along both lower frame member (20) and side frame member (22), which indeed requires no other separate members and parts in assembly and thus expediting the processes for assembling the seat back frame (BF) at an extremely low cost.

(iii) In the case where the armrest (AR) is not mounted to the seat back frame (BF), the reinforcing bar element (1) may easily be removed from those lower frame member (20) and side frame member (22) by simply unfastening and disengaging the three bolts therefrom. And, when the large-sized armrest (AR) is mounted to the seat back frame (BF), the reinforcing bar element (1) may easily be connected with those lower frame member (20) and side frame member (22) at only such three bolting points. This means that the reinforcing bar element (1) can be directly and easily used for any ordinary conventional seat back frame, and therefore, there is eliminated the troublesome need for forming two separate seat back frames, one of which is used in the case of the large-sized armrest (AR) being mounted thereto, and another of which is used in the case of any large-sized armrest (AR) being not mounted thereto.

While having described the present invention so far, it should be understood that the invention is not limited to the illustrated embodiment, but any other modification, replacement and addition may be applied thereto without departing from the scopes of the appended claims.

What is claimed is:

1. A seat back frame of automotive seat, which allows an armrest to be mounted thereto, comprising:
    an upper frame member;
    a lower frame member disposed below said upper frame member;
    a pair of side frame members connected between said upper and lower frame members, wherein one of said pair of side frame members has a point to which said armrest is to be mounted; and
    a reinforcing element provided longitudinally between said lower frame member and said one of said pair of side frame members, said reinforcing element including:
    a long portion extending in the longitudinal direction thereof; a short vertical portion extending vertically and continuously from said long portion;
    at least two spaced-apart securing points defined in said long portion; and
    at least one securing point defined in said vertical small portion, wherein said long portion is removably and securely connected with and along said lower frame member at said at least two first spaced-apart securing points, and wherein said short vertical portion is removably and securely connected with said one of said pair of side frame members at said at least one securing point.

2. The seat back frame of automotive seat as claimed in claim 1, wherein said long portion of said reinforcing element extends along said lower frame member and terminates in an end disposed near to another of said pair of side frame members.

3. The seat back frame of automotive seat as claimed in claim 1, wherein said reinforcing element is formed by bending a rigid bar material in a generally L-shaped configuration comprising: a longitudinally extending long bar portion corresponding to said long portion; and a vertically extending short bar portion which extends vertically and continuously from said longitudinally extending long bar portion, said vertically extending small bar portion corresponding to said short vertical portion.

4. The seat back frame of automotive seat as claimed in claim 1, wherein said lower frame member has a flat surface, wherein said one of said pair of side frame members also has a flat surface, wherein said reinforcing element is formed by bending a rigid bar material in a generally L-shaped configuration comprising: a longitudinally extending long bar portion corresponding to said long portion; and a vertically extending short bar portion which extends vertically and continuously from said longitudinally extending long bar portion, said vertically extending short bar portion corresponding to said short vertical portion, wherein said at least two spaced-apart securing points are defined by at least two spaced-apart flattened regions formed in said longitudinally extending long bar portion, said at least two spaced-apart flattened regions each having a securing hole formed therein, thus providing two securing holes in the respective said two spaced-apart flattened regions, wherein said at least one securing point is defined by at least one flattened region formed in said vertically extending short bar portion, said at least one flattened region having a securing hole formed therein, and wherein said at least two flatted regions of said longitudinally extending long bar portion are removably and securely connected with said flat surface of said lower frame member by inserting at least two securing means through the respective said two securing holes and fastening said at least two securing means to said flat surface of said lower frame member, whereas on the other hand, said at least one flattened region of said vertically extending short bar portion is removably and securely connected with said flat surface of said one of said pair of side frame members by inserting at least one securing means through said at least one securing hole and fastening said at least one securing means to said flat surface of said one of said pair of side frame members.

5. The seat back frame of automotive seat according to claim 4, wherein a bead portion is formed in said flat surface of said lower frame member so as to be recessed therefrom, said bead portion extending in longitudinal direction of said lower frame member, wherein said longitudinally extending long bar portion is removably and securely connected with and along said bead portion by inserting said at least two securing means through the respective said two securing holes and fastening said at least two securing means to said bead portion.

* * * * *